(12) United States Patent
Schabacker et al.

(10) Patent No.: US 10,901,131 B2
(45) Date of Patent: Jan. 26, 2021

(54) LINEAR LIGHTING DEVICE

(71) Applicant: SCHOTT AG, Mainz (DE)

(72) Inventors: Stephan Schabacker, Frankfurt (DE); Bernd Woelfing, Mainz (DE); Eric Senner, Hackenheim (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/775,655

(22) Filed: Jan. 29, 2020

(65) Prior Publication Data

US 2020/0241189 A1 Jul. 30, 2020

(30) Foreign Application Priority Data

Jan. 29, 2019 (DE) .......................... 10 2019 102 181

(51) Int. Cl.
*F21V 8/00* (2006.01)

(52) U.S. Cl.
CPC ............. *G02B 6/001* (2013.01); *G02B 6/005* (2013.01); *G02B 6/0028* (2013.01); *G02B 6/0065* (2013.01)

(58) Field of Classification Search
CPC ...... G02B 6/001; G02B 6/005; G02B 6/0028; B60Q 3/208
See application file for complete search history.

(56) References Cited

U.S. PATENT DOCUMENTS

| | | | |
|---|---|---|---|
| 7,445,358 B2 | 11/2008 | Matsushita | |
| 2008/0170414 A1* | 7/2008 | Wang | G02B 6/0028 362/612 |
| 2013/0148373 A1 | 6/2013 | Bayersdorfer | |
| 2013/0314940 A1 | 11/2013 | Russert | |
| 2014/0362597 A1 | 12/2014 | Verrat-Debailleul | |
| 2015/0009687 A1 | 1/2015 | Lin | |
| 2015/0210040 A1 | 7/2015 | Böhm | |
| 2015/0274066 A1* | 10/2015 | Del Pozo Gonzalez | B60Q 3/54 362/551 |
| 2016/0129945 A1 | 5/2016 | Deppe | |
| 2017/0045666 A1 | 2/2017 | Vasylyev | |
| 2018/0188437 A1* | 7/2018 | Hagen | G02B 27/0955 |

(Continued)

FOREIGN PATENT DOCUMENTS

| | | |
|---|---|---|
| DE | 10129953 | 1/2003 |
| DE | 10320614 | 12/2004 |

(Continued)

*Primary Examiner* — William N Harris
(74) *Attorney, Agent, or Firm* — Ohlandt, Greeley, Ruggiero & Perle, L.L.P.

(57) ABSTRACT

A luminous glazing is provided that includes a pane and a light guide. The pane has two opposite faces and is transparent in the visible spectrum. The light guide has a core surrounded by a cladding so that the core is capable of guiding light along the longitudinal extension of the light guide. The light guide includes a light scattering element so that when light is injected into one of the end faces if the light guide, the light guide is a side-emitting light guide and forms a linear light source. The light guide extends along the faces and is disposed on one face such that the light scattering area is spaced apart from the face and so that light guided in the core, scattered, and laterally exiting from the light guide enters the transparent pane through the face and is be transmitted through the pane to the opposite face.

20 Claims, 6 Drawing Sheets

(56) References Cited

U.S. PATENT DOCUMENTS

| | | | |
|---|---|---|---|
| 2018/0194113 A1 | 7/2018 | Klein | |
| 2018/0345631 A1 | 12/2018 | Klein | |
| 2019/0001875 A1 | 1/2019 | Xu | |
| 2019/0025500 A1 | 1/2019 | Bhatia | |
| 2019/0135170 A1* | 5/2019 | Salter | B60Q 3/208 |
| 2019/0184895 A1* | 6/2019 | Oshina | B60Q 3/208 |
| 2019/0285791 A1* | 9/2019 | Gloss | G02B 6/0031 |
| 2019/0293255 A1* | 9/2019 | Meijers | F21S 43/237 |

FOREIGN PATENT DOCUMENTS

| | | |
|---|---|---|
| DE | 102010030660 | 12/2011 |
| DE | 102012208810 | 11/2013 |
| DE | 102014100838 | 7/2015 |
| DE | 102014110120 | 1/2016 |
| DE | 102017100754 | 7/2018 |
| DE | 202018103669 | 7/2018 |
| EP | 0856615 | 8/1998 |
| EP | 1834836 | 9/2007 |
| FR | 3053629 | 1/2018 |
| FR | 3055833 | 3/2018 |
| JP | H09304623 | 11/1997 |
| WO | 2013093301 | 6/2013 |
| WO | 2014202526 | 12/2014 |
| WO | 2017029254 | 2/2017 |
| WO | 2017153331 | 9/2017 |

* cited by examiner

LINEAR LIGHTING DEVICE

CROSS REFERENCE TO RELATED APPLICATIONS

This application claims benefit under 35 USC § 119 of German Application No. 10 2019 102 181.2 filed Jan. 29, 2019, the entire contents of which are incorporated herein by reference.

BACKGROUND

1. Field of the Invention

The invention generally relates to lighting, in particular for decorative purposes or as display elements. More particularly, the invention relates to lighting with linear light output.

2. Description of Related Art

Linear lighting devices are used as design elements for decorative highlighting of contours, inter alia. For example, DE 20 2018 103 669 U1 discloses a light pipe which extends around the periphery of the opening of a trim component which surrounds a moonroof opening and is held in place by a carrier or a stanchion. The light pipe extends in a gap between the headlining and the roof. However, if the width of the gap or the spacing between the light pipe and the edge of the headlining is uneven, this will be emphasized by the resulting inhomogeneity in brightness.

WO 2013/093301 A1 discloses an illuminating glazing unit for vehicles including two spaced-apart sheets of glass. Light is injected into the edge of the sheet facing the interior from an arrangement of light-emitting diodes spaced apart from the edge. However, in this arrangement, stray light may get past the glass sheet into the interior. Also, the punctiform LEDs may cause inhomogeneous lighting.

DE 10 2014 100 838 A1 describes a cover for a motor vehicle roof. The cover is used as a light guide. For this purpose, it comprises a layer stack having two sheets which are bonded to one another by an adhesive, with refractive indices of the adhesive and the second sheet being different. A light source is attached to an edge of the first sheet which projects beyond the second sheet and injects light into the edge of the second sheet. The injection into the edge requires a high optical quality of the edge. The separate light sources may also cause inhomogeneities in spatial light emission.

An arrangement for closing an opening in a vehicle roof is known from WO 2014/202526 A1, the arrangement comprising a transparent pane, a light guide film arranged on the pane, on an underside of the pane facing the passenger compartment, into which light from a light source of the arrangement can be injected, and which is configured so as to emit the injected light into the passenger compartment. However, the injecting of light into the edge of a film requires the film and the light source to be aligned exactly.

EP 0 856 615 A2 describes a glass component for passively illuminating interior spaces by directing light. The glass component comprises at least one transparent panel which is bonded to two glass sheets on its main surfaces. The glass component moreover comprises a planar first light deflecting element which injects incident light beams into the panel at an angle at which total internal reflection occurs at the interfaces between the panel and the glass sheets. It moreover comprises a second light deflecting element which is arranged at a distance from the first light deflecting element and which serves to output light beams from the panel.

From WO 2017/153331 A1, a composite pane is known which comprises an outer pane and an inner pane, which are bonded to each other via an intermediate layer. A light diffusing glass fiber which is suitable for emitting light by diffusion via its side wall along its extension length is arranged, in sections, between the intermediate layer and the outer pane and between the intermediate layer and the inner pane and extends through at least one opening in the intermediate layer. However, this requires complex assembly and fixing during lamination. The diameter of the optical fiber is limited by the thickness of the intermediate layer. In order to achieve sufficient coupling efficiency, a laser is proposed as the light source. However, this means that the illumination is limited to single-color applications.

WO 2017/029254 A1 discloses a laminated side pane for a side window of a vehicle comprising an outer pane and an inner pane that are bonded to one another via an intermediate layer, wherein the intermediate layer has, at least in some sections, a cutback relative to an edge of the pane.

A light diffusing optical fiber is at least partially arranged in the region of the cutback between the outer pane and the inner pane. Here, again, the thickness of the optical fiber is limited by the thickness of the intermediate layer, which leads to drawbacks similar to those in WO 2017/153331 A1. In the case of injection into the edge of a glass pane or film, as is the case in all the prior art described above except for DE 20 2018 103669 U1, the resulting illumination comprises light emitted over a large area. This makes the illumination appear darker than in the case of a more focused output of the same light intensity. Moreover, inhomogeneities in or on the pane are effective as scattering centers, which leads to punctiform light emission and thus also to an inhomogeneous light field.

Given such lights known from the prior art, there is therefore a need to improve luminance and homogeneity of the orchestration. Furthermore, complex installation should be avoided, also in view of avoiding stray light or undesired backlighting of gaps. Also, some of the systems require rather large installation space.

SUMMARY

The invention is therefore based on the object to provide illuminated glazing's which are less critical in manufacture in terms of adjustment of the light source and which provide uniform light emission in the intended light field.

Accordingly, a luminous glazing is provided which comprises a pane that is transparent in the visible spectral range and has two opposite faces, and at least one elongated light guide, the light guide comprising a core surrounded by a cladding, the core having a higher refractive index than the cladding, so that the core is capable of guiding light along the longitudinal extension of the light guide. The light guide has at least one light scattering area, so that it is adapted to cause light guided in the core to be scattered out in distributed manner along the longitudinal extent thereof. Thus, when light is injected into one of its end faces, it is effective as a side-emitting light guide thereby forming a linear light source. The light guide extends along the faces and is disposed on one face such that the light scattering area is spaced apart from this face and so that light guided in the core and scattered on the light scattering area and laterally exiting from the light guide enters the transparent pane through this face and can be transmitted through the pane to the opposite face. The light scattering area is preferably arranged at least partially inside the light guide, so that it can interact with the light guided in the core. In particular, the light scattering area may moreover be located at least partially inside the core. Alternatively or additionally, light scattering elements may also be located at the interface between the core and the cladding.

The distance of the light scattering area to the face is in a range of 0.5 to 0.95 times the diameter of the light guide, preferably in a range from 100 micrometers to 3 millimeters.

The transparent pane is most preferably a glass pane or comprises glass, for example in the form of a laminate. However, other materials may be used as well. In addition to glass, transparent plastics are worth considering.

This arrangement with light injection through a face of the pane has the advantage of being less sensitive to tolerances in the assembly with regard to the homogeneity of light intensity. Another advantage over injection into the edge is that no additional or specially designed installation space is required on the edge. Thus, the design of the glazing is more compact and also largely compatible with non-luminous glazing.

In the context of the present disclosure, the terms "elongated" and "linear" in relation to the light guide do not mean that the light guide has to be laid in a straight line. On the contrary, according to one embodiment of the invention it is contemplated that the light guide extends on the transparent pane with one or more directional changes in its longitudinal extension. Elongated light guide generally refers to a light guide that has a large longitudinal extent in comparison to its cross section, like a fiber or a rod. The light guide transmits the light along the core along its longitudinal extension in the manner of a light-conducting fiber. The linear light source may also appear as a luminous line for the viewer, which may also extend in a curve.

The light guide may be fixed on the glazing through a form fit, frictional fit, or material bond. According to one embodiment it is contemplated that the light guide is bonded to the face of the transparent pane using a transparent adhesive, so that light laterally emitted from the light guide is directed through the adhesive to the face. Thus, in addition to the mechanical fixing, the adhesive simultaneously provides optical coupling between the light guide and the transparent pane. A fixation using an adhesive generally defines a cohesive connection or material bond, but may also constitute a positive fit, for example if the light guide is completely embedded in the adhesive. An exemplary suitable adhesive is silicone, which is particularly suitable for bonding to glass. However, other adhesives such as synthetic resins in general can be used as well. A UV-curing adhesive is suitable for quick assembly, for example. The adhesive bond may as well be made so as to be releasable in order to allow for a replacement of the light guide, for example.

For the purposes of the present disclosure, face of the transparent pane is understood to mean an outward-facing surface of the pane. An inner interface between two layers of a pane in the form of a laminate therefore does not represent such a face. An example of this would be the inner surface of a glass pane of double-pane safety glass, which is bonded to the further glass pane via a plastic layer. Thus, the face on which the light guide is mounted is accessible from outside.

In contrast to the pane according to WO 2017/029254 A1, for example, the steps for producing the pane and for fastening the light guide can be separated from one another. In addition, there is no limitation to laminated glasses. Accordingly, a method for producing a luminous glazing according to the invention is furthermore provided, which comprises providing a pane which is transparent in the visible spectral range and has two opposite faces, and at least one elongated light guide, wherein the light guide comprises a core surrounded by a cladding, the core having a higher refractive index than the cladding, so that the core is capable of guiding light along the longitudinal extension of the light guide; wherein the light guide includes at least one light scattering area so as to cause light guided in the core to be scattered out in distributed manner along its longitudinal extent, so that when light is injected into one of its end faces it is effective as a side-emitting light guide and forms a linear light source; wherein the light guide is disposed and fixed on one face of the transparent pane such that the light guide extends along the faces and the light scattering area is spaced apart from this face so that light guided in the core and scattered on the light scattering element and laterally exiting from the light guide enters the transparent pane through the face and is transmitted across the pane to the opposite face. Thus, it is possible to first provide a pane of almost any design and then to attach the light guide to it.

The light guide preferably has a thickness in a range from 200 µm to 3 mm. Smaller diameters of about up to 500 µm are particularly suitable in conjunction with lasers as the light sources. Larger thicknesses allow to achieve sufficient light intensities with other light sources, such as in particular light-emitting diodes.

BRIEF DESCRIPTION OF THE FIGURES

The invention will now be explained in more detail with reference to the figures. In the figures, the same reference numerals designate the same or equivalent elements.

DETAILED DESCRIPTION

Figure 1:
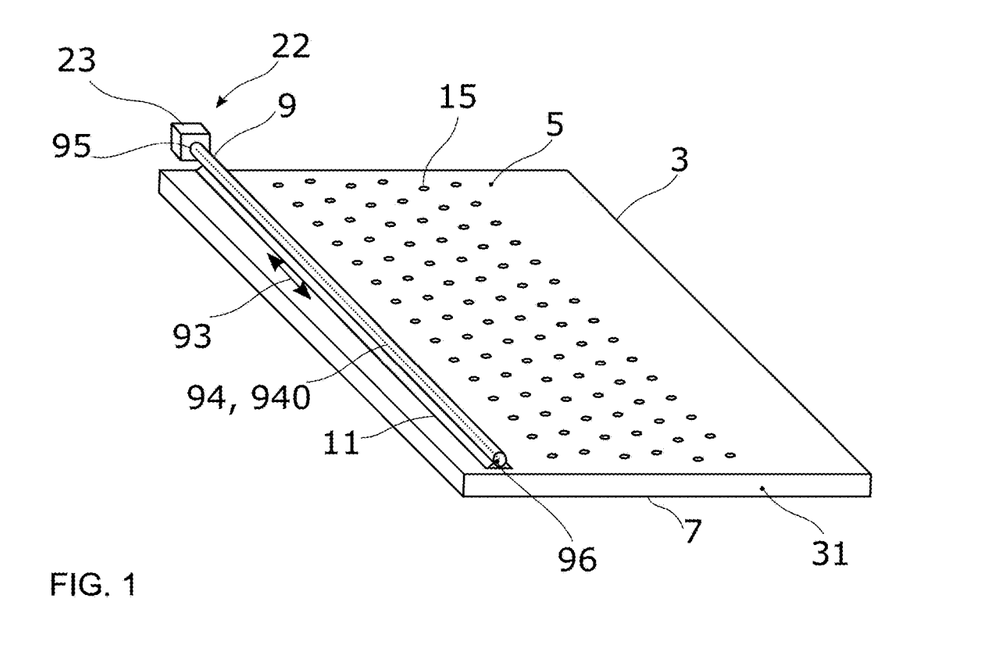
FIG. 1 shows a perspective view of a first embodiment of a glazing.

FIG. 1 shows a perspective view of a first embodiment of a glazing 1. Glazing 1 comprises a pane 3 which is transparent in the visible spectral range. Pane 3 has two opposite faces 5, 7 which are delimited by an edge 31 and which may also be referred to as main surfaces.

In order to make the glazing luminous, a light guide 9 is provided. As can be seen in examples (a) and (b) of FIG. 2, the light guide 9 has a core 92 surrounded by a cladding 91. The core 92 has a higher refractive index than the cladding 91, so that light can be guided in the core 92 along the longitudinal extension 93 of the light guide 9. Furthermore, the light guide 9 has at least one light scattering area 94. Light guided in the core 92 is scattered at this light scattering area in distributed manner along the longitudinal extent and is thus able to exit when the critical angle of total internal reflection is exceeded. Therefore, when light is injected into one of the end faces 95, 96, the light guide is effective as a linear or thread-like light source.

Figure 2:
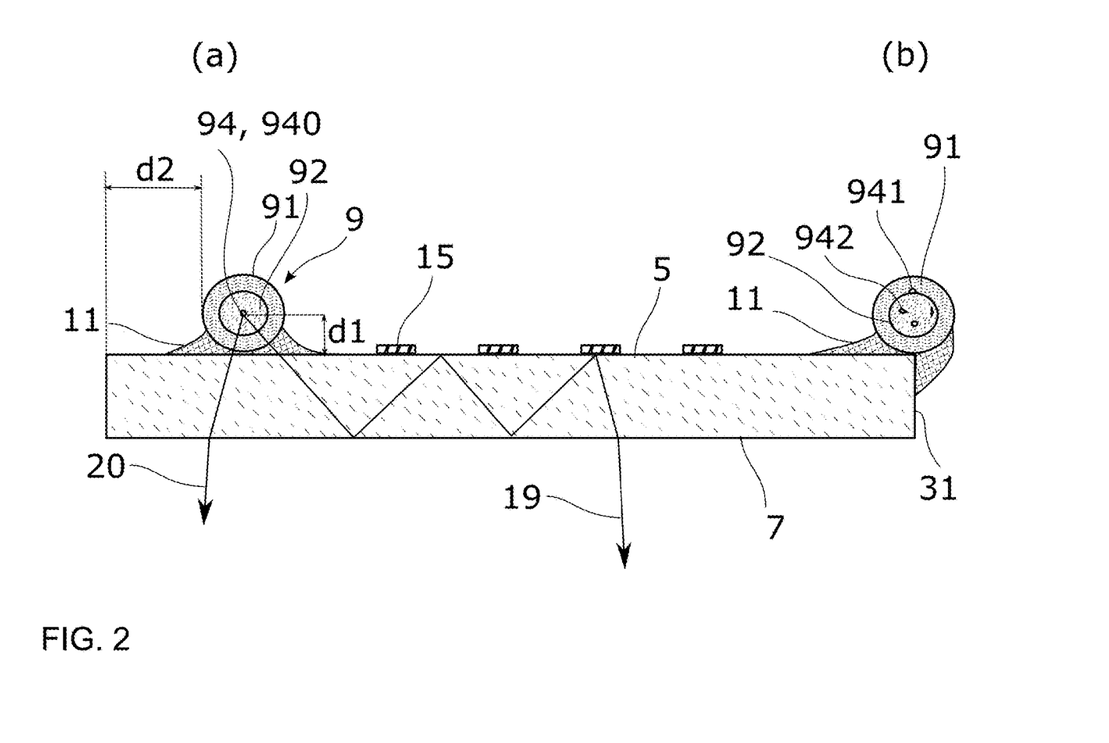
FIG. 2 shows examples of glazing in a sectional view.

According to a preferred embodiment of the glazing 1 it is contemplated that the light scattering element 94 comprises at least one inner core 940 extending within the core 92 along the longitudinal extension of the light guide 3. This inner core 940 may preferably be made of light diffusing glass. This embodiment allows to produce a particularly thin light source. Furthermore, since light emission is concentrated on the thread-like core 940, the light source moreover appears brighter. Such light guides and their manufacture have been described in detail in DE 10 2012 208 810 A1. The subject-matter of this document is fully incorporated into the present application with regard to the design, manufacture and properties of such light guides comprising one or more light scattering cores. More generally, without being limited to the illustrated example or to the light guides having a light scattering inner core 940, according to a further embodiment of the invention, the light scattering area 94 may be made of glass including scattering particles embedded therein, which have been generated by segregation or phase separation. Such light scattering particles are also provided in the side-emitting light guides according to DE 10 2012 208 810 A1.

A method that can be used to produce such a light guide 9 having a thin light scattering inner core, as described in DE 10 2012 208 810 A1, comprises arranging a plurality of light-guiding rods made of a glass having the refractive index n1 and at least one diffused rod made of a glass containing scattering centers in such a manner that the axes of the light-guiding rods and of the at least one diffused rod extend parallel to one another, at least largely, to obtain a preform, and heating the preform and drawing it out to form a side-emitting glass element or light guide, so that the outer circumferential surfaces of the light-guiding rods combine inseparably with one another and with the at least one diffused rod.

As can be seen from FIGS. 1 and 2, the light guide 9 extends along the faces 5, 7 and is disposed on one face, here face 5. In this way, the light scattering element 94 is spaced apart from face 5. In the example (a) of FIG. 2, the spacing is identified as "d1", which is the distance between inner core 940 and face 5 in this example. If light guided in the core 92 and scattered on the light scattering element 94 is emitted laterally from the light guide 9, it can enter the transparent pane 3 through the face 5 and can be transmitted across the pane 3 to the opposite face 7. Two light rays 19, 20 are indicated in FIG. 2 for the sake of clarification. The light rays emanate from the light scattering inner core 940, exit from the outer surface of light guide 9 and enter the pane 3 through face 5. Light beam 20 passes through the pane 3 at a rather steep angle, so that it can exit on the opposite face 7. The other light beam enters the pane 3 at a shallower angle, so that it is guided within the pane 3 by total internal reflection. The distance d1 is preferably in a range of 0.5 to 0.95 times the diameter of the light guide, more preferably in the range from 100 micrometers to 3 millimeters. In particular in the case of a light guide having a central light scattering inner core, this distance usually corresponds to approximately half the diameter of the light guide.

According to another embodiment, which is also implemented in the examples of FIGS. 1 and 2(*a*), the light guide 9 is arranged on the face 5 at a distance from the edge 31 of the transparent pane 3. In contrast thereto, in the example (b) of FIG. 2, the light guide (9) is located and fixed on or above the edge (31). An arrangement as in this example (b) may be advantageous for allowing to inject light into the pane also via the edge 31, for example with suitable optical coupling. However, a distance denoted "d2" in the example of FIG. 2(*a*) is advantageous, since this arrangement allows the light guide 9 to be easily mounted on the transparent pane 3. Another particular advantage is that a distance d2 between the edge 31 and the outer contour of the light guide allows the glazing 1 to be easily installed. With such distance it is possible to easily use existing or standardized edge frames for glazing without any need for considerable redesign.

As an alternative or in addition to a light scattering inner core as a light scattering element, other embodiments are also possible. Pores, in particular in the form of bubbles, crystallites, or phase-separated zones may also be effective as light scattering elements 94 in the glass. This is shown in example (b) of FIG. 2. Here, the core 92 of light guide 9 includes distributed pores 941 and crystallites or particles 942. Each of these features is effective as a light scattering element 94. As shown by way of one of the pores 941, light scattering elements 94 may also be located at the interface between core 92 and cladding 91.

The light scattering element 94, such as the inner core 940, may thus essentially consist of a matrix of transparent glass, fused silica, or glass ceramics, and the scattering elements embedded therein may, in the case of a glass matrix, be pores, particles, porous or pigmented, or for example white-colored glass or glass ceramic features, for example, or glass or glass ceramic elements containing inhomogeneities and the crystallites contained therein, in the case of a fused silica matrix this may be pores, porous fused silica, or ceramic or polycrystalline particles, or in the case of a transparent glass ceramic matrix this may be pores, particles, porous or pigmented or for example white-colored glass or glass ceramic features or glass or glass ceramic elements containing inhomogeneities and the crystallites contained therein. Combinations of the scattering elements mentioned by way of example may likewise advantageously be included in the respective matrix. The inhomogeneities of the glass or the glass ceramic, which may define the scattering elements in solutions comprising a glass or glass ceramic matrix, include phase separations, segregations and/or particulate inclusions, seeds and/or crystallites, for example. The concentration of the scattering elements should be in a range from 10 ppm to 1000 ppm and preferably from 20 ppm to 100 ppm. The concentration in ppm refers to the proportion of the scattering particles in relation to the mass fraction of the constituents of the respective material in which the scattering particles are embedded, in particular the plastic, glass matrix or fused silica matrix. The respective scattering features provided, i.e. for example the pores, particles, porous or pigmented or, for example, white-colored or inhomogeneities-containing glass or glass ceramic elements and the crystallites contained therein preferably have a diameter from 10 nm to 1000 nm, most preferably from 100 nm to 800 nm.

A lighting device 22 is provided for generating the light to be emitted from the light guide 9. It is provided together with the light guide 9 for injecting the emitted light into one or both end faces 95, 96 thereof. Generally, without being limited to the illustrated examples, the lighting device 22 particularly preferably comprises a semiconductor light emitter 23 coupled to the light guide 9 or to one or both end faces 95, 96 thereof. Possible semiconductor light emitters 23 include light-emitting diodes and also semiconductor lasers and optionally also diode-pumped solid-state lasers.

Without being limited to the specific examples shown in FIGS. 1 and 2, it is contemplated according to a preferred embodiment that the light guide 9 is bonded to the face 5 of the transparent pane 3 by a transparent adhesive 11, so that light emitted laterally from the light guide 3 is transmitted through the adhesive 11 to the face 5. Thus, the adhesive 11 is used not only for securing the light guide 9 but also for optical coupling.

According to a further embodiment, it is furthermore generally contemplated that the light guide 3 is optically coupled to the face 5 in such a way that part of the light emitted by the light guide 9 is guided within the pane 3 by total internal reflection. In particular, as in the example shown, the light guide 9 may be optically coupled to the face 5 such that the light enters the transparent pane 3 such that it is directed away from the light guide 9 by total internal reflection within the pane 3. The light thereby propagates away from the light guide, so that light emission can be distributed over the pane or may occur at a location remote from the light guide. This condition is met in particular if the light enters the pane at a sufficiently oblique angle. In the specific exemplary embodiment, this coupling is achieved by an adhesive 11 sufficiently well embedding the light guide so that light rays such as the indicated light ray 19 reach the face 5 sufficiently obliquely through the adhesive. Optical bonding of the light guide 9 to the pane 3 is preferably achieved using a transparent adhesive, with the refractive indices of the pane 3 and the adhesive 11 matched as far as possible. Suitable adhesives include UV-curing acrylic adhesive, or silicone.

This light can then be used to achieve an at least partial or section-wise 2-dimensional illumination effect or, more generally, to emit light from the glazing at locations remote from the light guide. For this purpose, it is furthermore contemplated in one embodiment that the transparent pane 3 has light output elements 15 which cause the light guided in the pane 3 by total internal reflection to change direction, at least partially, so that the light exits from the pane 3. This change in direction can be simply achieved by scattering, accordingly the changes in direction will be random. The light output elements 15 may be simply attached on one or both faces 5, 7, as in the examples in FIGS. 1 and 2. For example pattern elements of a patterned light scattering coating are suitable as light output elements. Alternatively or additionally, light output elements 15 may be included in the volume of pane 3. The light ray 19 shown in FIG. 2 illustrates this case. When incident on a light output element 15 on face 5, light ray 19 is scattered and then incident on the opposite face 7 at a steeper angle. At this angle, the light ray is no longer reflected, but exits from pane 3.

According to a further alternative or additional embodiment, light may also be emitted by fluorescence or phosphorescence. For this purpose, the light output element comprises a phosphor which absorbs the primary light coming from the light guide and emits fluorescent light with a longer wavelength. Accordingly, the light output elements are excited to fluorescence or phosphorescence, by the light guided in the pane 3, for emitting light. This embodiment is well suited for particular color effects. It is even possible to provide a UV light source as the lighting device. In this case, the light coming directly from the light guide will not or hardly be visible to the viewer and the light output elements will mainly contribute to the illumination.

Diameters in the range from 200 µm to 3 mm are particularly suitable for the light guide. In particular light guides having a light scattering inner core as in the examples of FIG. 2 are preferably chosen to be thicker, in particular with a diameter in the range from 1 mm to 3 mm. Preferred thicknesses of the transparent pane 3 are also in the order of millimeters. Without being limited to the illustrated example or to the type of light guide 9, it is contemplated according to one embodiment of the glazing 1 that the ratio between the diameter of the light guide 9 and the thickness of the transparent pane 3 is in the range from 0.01 to 5, preferably from 0.02 to 2.5, in particular in the range from 0.2 to 1.5.

In a preferred embodiment, the transparent pane generally has a thickness from 1 mm to 20 mm, preferably from 2.5 mm to 8 mm, without being limited to specific examples. Thicker panes of up to 20 mm or possibly even thicker, for example in the range from 5 mm to 50 mm, are preferably used for glazing in the architectural field. Thinner panes in the range of up to 5 mm are particularly suitable for vehicle glazing.

Generally, the light output elements 15 may be structures of a coating that is applied to a face, as in the example in FIG. 2. It will be apparent to a person skilled in the art that this embodiment is not limited to the features of the example of FIG. 2. For example, the light output elements 15 may also be provided on both faces 5, 7. Furthermore, different types of light output elements may be combined. Also, the coating may be designed differently. In the example of FIG. 2, discrete light output elements 15 are provided. However, the light output elements may also be distributed in a continuous coating on one or both of the faces 5, 7.

Figure 3:
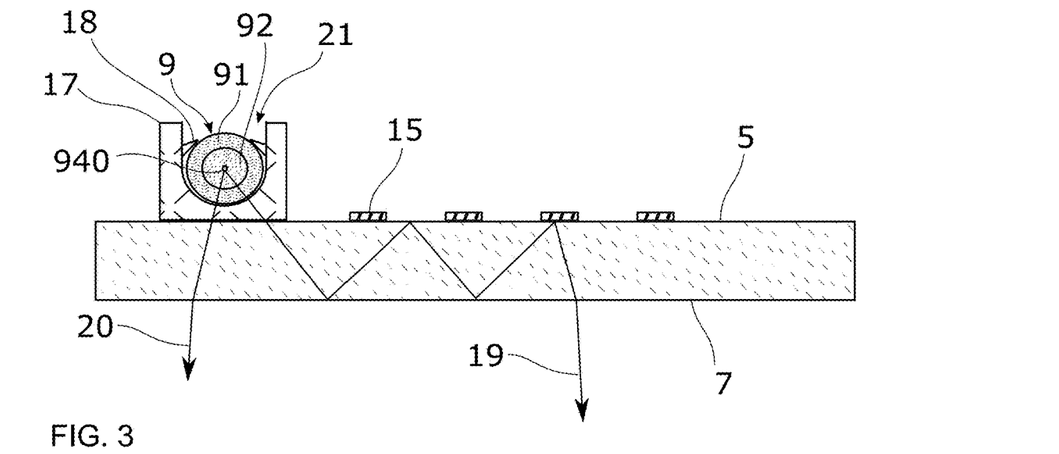
FIG. 3 shows a sectional view of a further embodiment, in which the light guide is fixed in a holder.
Figure 4:
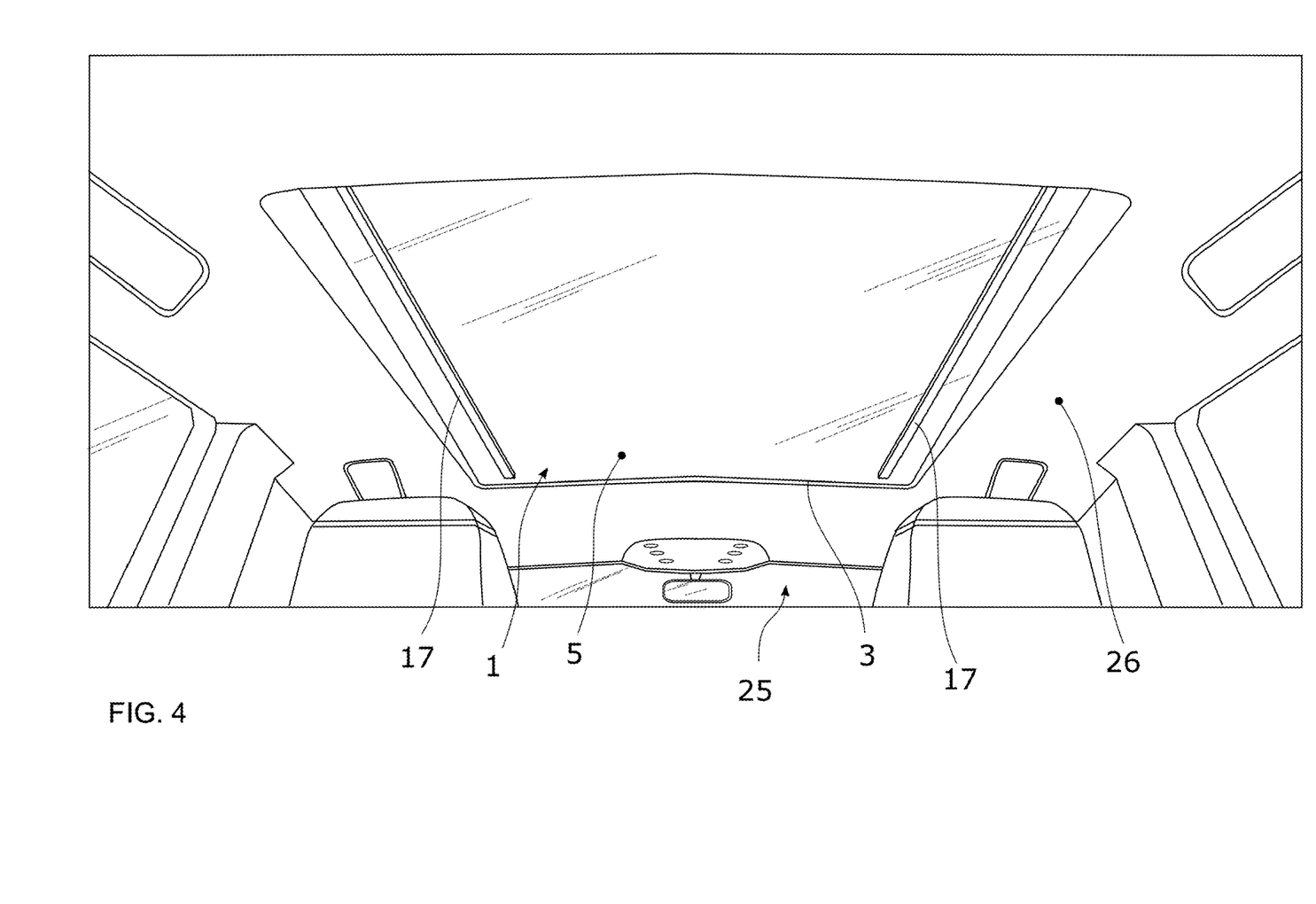
FIG. 4 shows a passenger compartment with a luminous glazing.

In the illustrated example, the light guide 9 is directly bonded to the pane 3, by the adhesive. However, it may also be advantageous to provide a holder which is used to attach the light guide to the pane. Therefore, according to a further embodiment, a holder is provided connected to the transparent pane, which retains the light guide in contact to or at a distance from the face. FIG. 3 shows an example of such an embodiment, also in a sectional view. A holder in the form of a profiled holder 17 is provided, which has a groove 21 for the light guide 9. The profiled holder 17 may also be bonded to the face 5 of the transparent pane 3 using a transparent adhesive, for example. The light guide 9 is introduced into the groove 21 of the profiled holder 17, for fixation. The profiled holder 17 may have latching members 18 provided thereon, as illustrated, engaging the light guide 9 when the light guide 9 is inserted into the groove 21 and thus fixing it. In this embodiment, the light emitted by the light guide passes through the holder 17 before entering the transparent pane 3, as illustrated. In this embodiment, it is favorable for the profiled holder 17 to be transparent. However, the profiled holder 17 may also be designed such that it does not need to be made of transparent material. A profiled holder 17 is generally of advantage if, for the event of breakage of the glazing, it is desired to prevent any sharp fragments of the light guide 9 to become accessible. Such fragments will remain fixed in the holder 17, so that the risk of injury is reduced. A profiled holder 17 is therefore particularly advantageous in combination with a light guide 9 made of glass and in the case of vehicle glazing with light guides 9 facing the passenger compartment. One example of this is shown in FIG. 4. More generally, without being limited to the illustrated example, a luminous glazing according to the present disclosure is particularly suitable as a vehicle glazing, in particular as a roof glazing of a vehicle. FIG. 4 shows the view from a back seat in the passenger compartment 25 of a passenger car to the headlining 26.

Embedded in the headlining 26 is luminous glazing 1 which accordingly is designed as a moonroof. Similar to the example of FIG. 3, two light guides 9 are held in profiled holders 17 on the face 5 of transparent pane 3. Face 5 defines the inner surface of glazing 1, so that the light guides 9 are accordingly also arranged on the inside, but not visible in this view, since they are routed inside the profiled holders 17. Since the light guides and also the profiled holders 17 in this case are arranged on face 5 and at a distance from the edge 31 of the transparent pane 3, the edge configuration of the roof glazing is not or only marginally impacted by the lighting devices. Therefore, the luminous glazing can be easily combined with existing designs for installing and sealing glazing in motor vehicles.

Figure 5:
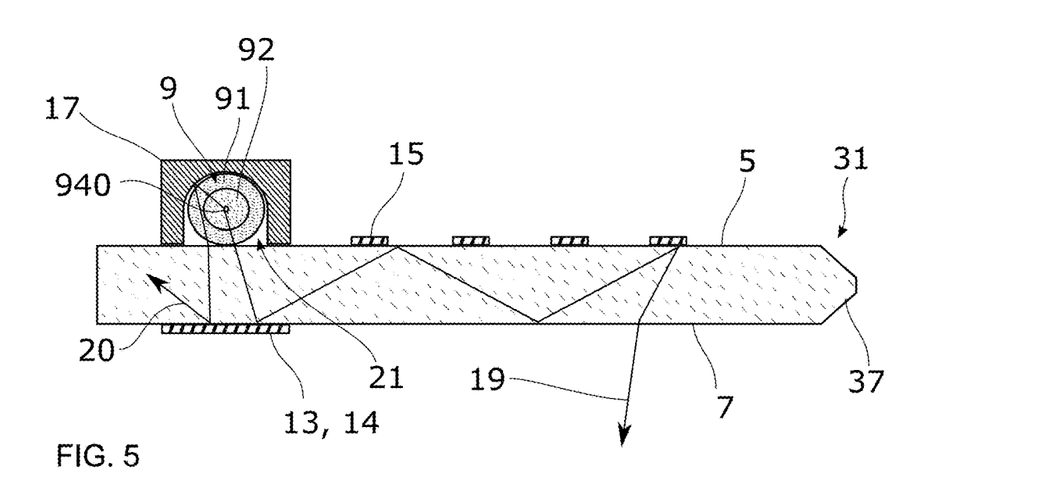
FIG. 5 shows a further embodiment with a light guide fixed in a holder.

A profiled holder does not need to be transparent in order to guide light emitted by the light guide into the transparent pane. FIG. 5 shows an example with a profiled holder that may be made of both transparent and opaque material. In contrast to the example of FIG. 3, the groove 21 of the profiled holder 17 opens towards the transparent pane 3 here, so that the light can reach the face 5 through the groove 21. The inner surface of groove 21 may be adapted to reflect light. In this case, the surface may be diffusely reflective or light scattering or else specularly reflective. In the illustrated example, the inner surface of groove 21 is diffusely reflective, as can be seen from the beam path of the exemplary light ray 20.

The use of a non-transparent material for profiled holder 17 may have several advantages. In this way, the profiled holder 17 prevents the light guide 9 from being directly visible when face 5 faces the viewer. A particular advantage is that highly impact-resistant material such as metal may be used for the profiled holder 17. In the embodiment according to FIG. 5, a straight light guide may be introduced in the longitudinal direction into the profiled holder already fixed on the transparent pane 3, for assembly thereof. It is also possible to first insert the light guide 9 into the profiled holder 17 and then fix the profiled holder 17 on the pane 3.

According to a further embodiment which is also implemented in the glazing according to FIG. 5 by way of example, a light blocking element 13 is disposed on the face 7 of transparent pane 3 opposite light guide 9 and at least partially prevents light from exiting through the opposite face 7. This is light which crosses the transparent pane 3 emanating from light guide 9, in particular light emanating from light guide 9 and being transmitted through the transparent pane for the first time. The light blocking element 13 prevents the light guide 9 from being directly visible when looking at face 7. However, the light blocking element 13 may in particular have a further function. In a preferred embodiment, the light blocking element 13 is designed as a light deflecting element 14 which at least partially deflects incident light in another direction, back into the transparent pane 3. In the exemplary embodiments of FIGS. 2 and 3, the light guide 9 is optically coupled to the pane in such a manner that part of the light is able to enter the pane in such a way that the condition for total internal reflection is fulfilled. Alternatively or additionally, the condition for total internal reflection can also be achieved with a light blocking element designed to deflect light. In a simple embodiment, the light blocking element 13 may be adapted to be scattering or diffusely reflective, as shown in FIG. 5. For this purpose, the light blocking element 13 may comprise a light scattering coating, like the light output elements 15. It is absolutely possible to use the same coating for the light blocking element 13 as for the light output elements 15.

The effect of the light blocking element 13 for injecting the light emitted by the light guide into the transparent pane is explained by the two exemplary light rays 19, 20. The two light rays pass through the transparent pane 3 at a relatively steep angle and are then incident on the light blocking element 13 on face 7, which scatters the light rays into different directions. The scattering causes the light ray 19 to be deflected or change its direction, so that the condition for total internal reflection is met and the light beam is further conducted within pane 3. Finally, the light ray 19 is scattered out of the transparent pane 3 after having again been scattered on a light output element 15.

Generally, without being limited to the illustrated example, a light deflecting element may therefore be provided in one embodiment of the glazing 1, which at least partially deflects light emanating from the light guide 9 and passing through the transparent pane 3 into the direction along faces 5, 7, so that the light is guided within pane 3 by total internal reflection.

Depending on the appearance of the luminous glazing, which is predetermined or to be achieved, light blocking elements 13 and/or light output elements 15 may advantageously be arranged on faces 5 and/or 7 in a suitable combination.

In the embodiments shown so far, the light was deflected by scattering to be either injected into the pane or emitted from the glazing 1 at the light output elements 15. Other elements may also be used to deflect the light. According to one embodiment of the invention, it is contemplated that the light output elements comprise transparent optical elements each having at least one optically effective refractive or reflective surface.

Figure 6:
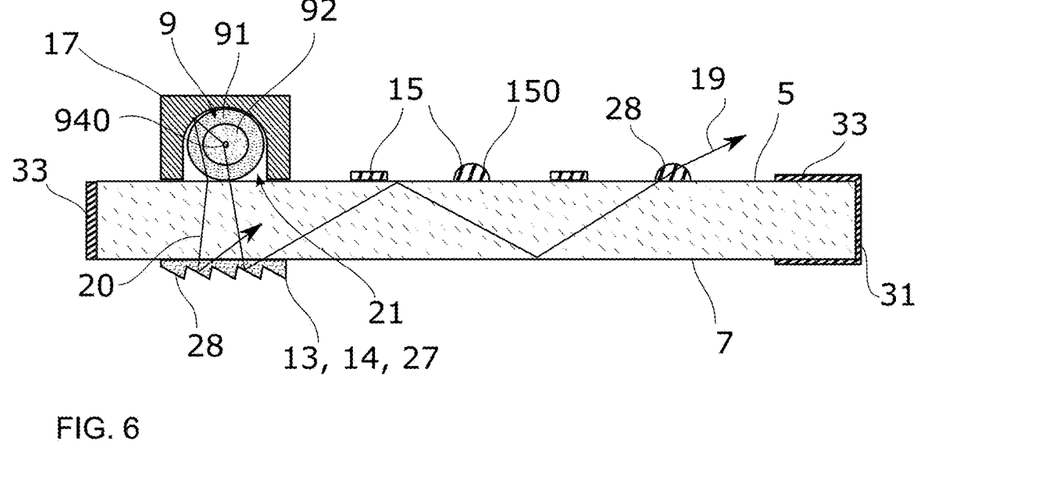
FIG. 6 shows a variant of the embodiment of FIG. 5 with a prism array for deflecting light.

It is likewise possible to provide a light deflecting element on the side of the transparent pane 3 opposite the light guide 9, which deflects light emanating from the light guide 9 and passing through the transparent pane 3 into the direction along the side faces 5, 7, at least partially, so that the light is guided within the pane 3 by total internal reflection, and such light deflecting element has at least one optically effective refractive or reflective surface in order to deflect the light into the direction along the transparent pane 3 or along the faces 5, 7, so that the light is guided within the pane 3 by total internal reflection. Such a light deflecting element 14 is shown in the example of FIG. 6. In this example, the light deflecting element 14 which is also effective as a light blocking element comprises a prism film 27. The prismatic surfaces extending obliquely to the face 7 are the optically effective light refractive or light reflective surfaces 28 of the light deflecting element 14. More generally, without being limited to the illustrated example, one embodiment of the invention contemplates an arrangement with one or more prisms located on the pane 3 opposite the light guide 9 for deflecting the light emitted laterally from the light guide into the direction along the pane 3 or along faces 5, 7. The arrangement may also be created in a different way than by attaching a prism film 27, for example by grinding prism-shaped patterns into the face 7, or by fastening individual prism rods.

Furthermore, some or all of the light output elements 15 may generally also be in the form of transparent elements having an optically active light refractive surface 28. This embodiment is also implemented in the example shown in FIG. 6. For example, the light output elements 15 can be in the form of lenses, as illustrated. Prism-shaped structures are also possible, for example.

According to yet another embodiment of the glazing 1, it is contemplated that at least a portion of the edge 31 of the transparent pane 3 is adapted to be light-reflective, so that light guided within the pane 3 by total internal reflection and incident on the edge 31 is reflected back into the pane 3. This is advantageous in order to reduce brightness losses due to light exiting at the edge, inter alia. In the example shown in FIG. 6, the edge 31 closest to the light guide 9 is provided with a light-reflective coating 33. It is of course also possible to have the entire circumferential edge 31 adapted so as to reflect light. On the other hand, it may also be desirable, for design or functional reasons, that the edge 31 emits light at least in sections thereof. In this case, a coating may be interrupted or omitted. According to yet another embodiment, the light reflective coating 33 may extend around the edge 31 to moreover cover a peripheral edge area of one or both faces 5, 7 adjacent to the edge 31. Such a light reflecting edge 31 is shown on the right side of FIG. 6.

According to yet another embodiment, the edge 31 may be adapted to reflect the light guided in the pane due to suitable shaping. Moreover, this reflection may also be a total internal reflection. An edge 31 shaped correspondingly is shown in FIG. 5. Here, the edge 31 has two chamfers 37. Light that is incident on the chamfers from inside is reflected on a chamfer to the opposite chamfer and directed back into the pane 3 by the opposite chamfer. A C-cut with rounded edges also has a similar reflective effect.

Figure 7:
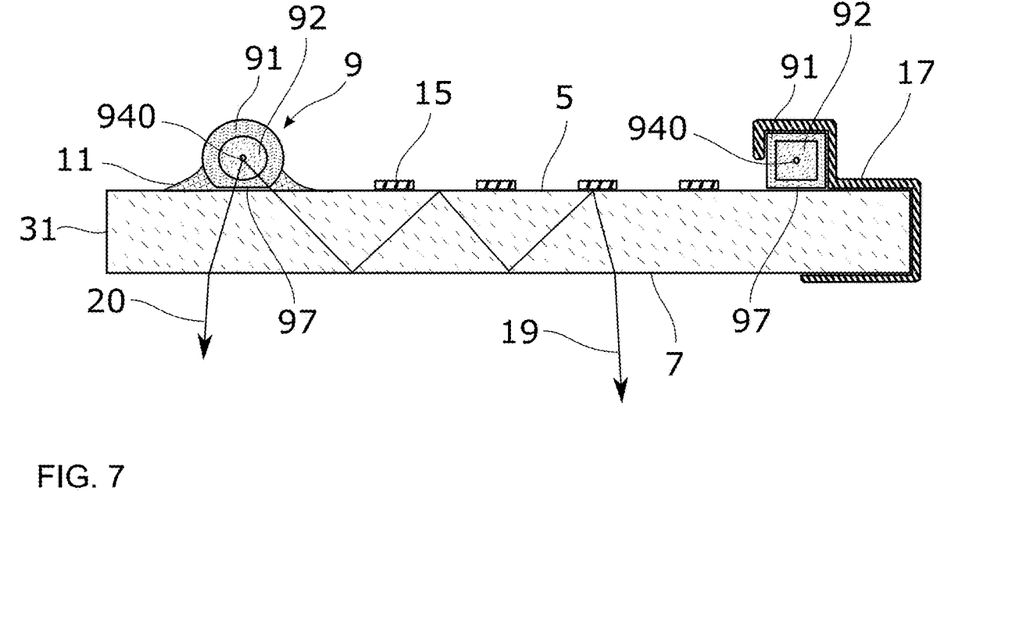
FIG. 7 shows embodiments in which the shape of the light guide is adapted to the transparent pane.

In order to improve optical coupling of the light guide 9, the cross-sectional shape of the light guide 9 may be adapted to the transparent pane 3, according to another embodiment. Specifically, according to one embodiment, the light guide 9 may have a flattened cladding section defining a contact surface of the light guide on the transparent pane 3 or facing the transparent pane 3. FIG. 7 shows two examples of this embodiment with a cross-sectional shape of the light guide adapted to the pane 3. The light guide 9 shown on the left in FIG. 7 has a circular cross-sectional shape of the core 92, as in the previous examples. The cladding 91 is also round, but has a flattened cladding section 97 which defines a contact surface of the light guide 9 on the face 5. In other words, cladding section 97 defines a facet on the cladding outer surface. However, the light guide 9 may in general also be flattened to such an extent that the flattened section or facet also cuts the core 92. The core 92 is thus exposed on the flattened section. Even in this embodiment, the light can still be conducted by total internal reflection in the core if the medium adjoining the core on the flattened section, i.e. the transparent pane or a transparent adhesive used for bonding, has a sufficiently low refractive index.

In the example shown on the right, the light guide 9 has an overall angular or polygonal cross-sectional shape. The flattened cladding section 97 defining the contact surface of the light guide 9 on the pane 3 is defined by one of the polygon faces here. Specifically, the light guide 9 has a square cross-sectional shape here, but other shapes are also possible, for example triangular or pentagonal cross sections. The contacting flattened side or flattened cladding section provides for good optical coupling of the light guide to the transparent pane 3.

For fixing the light guide 9, a preferably transparent adhesive 11 was again used in the example shown on the left. As an alternative or in addition, the example on the right uses a profiled holder 17 for holding the light guide 9. More generally, without being limited to the specific illustrated example, the profiled holder 17 may also surround the edge 31 of the transparent pane 3, as shown. This is advantageous in order to achieve a simple fixation and mounting of the light guide, inter alia.

Figure 8:
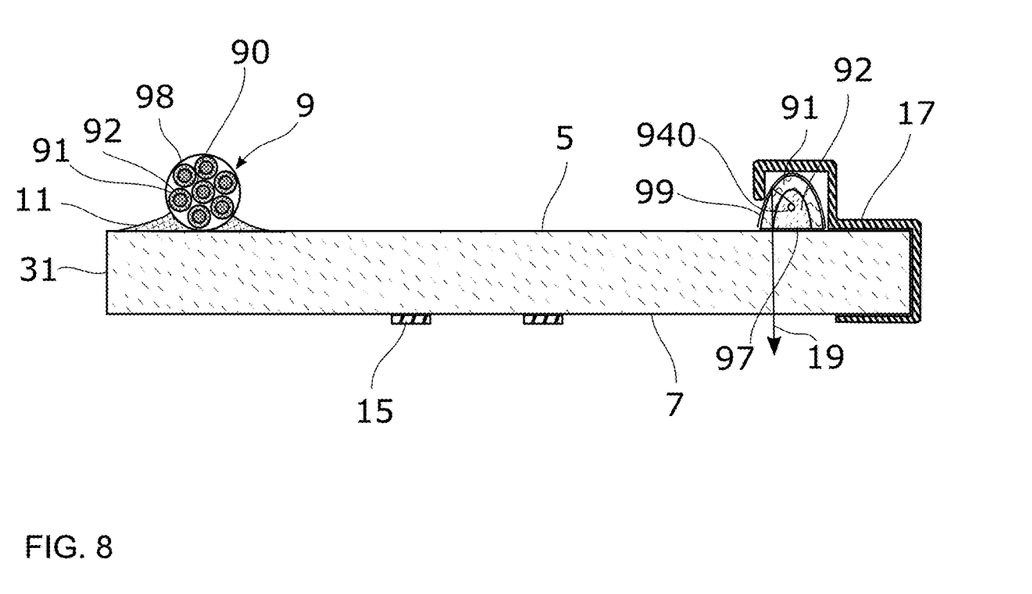
FIG. 8 shows further examples of special shapes of light guides.

FIG. 8 shows further examples of special forms of light guides 9. The light guide 9 shown on the left on the pane is not an individual optical fiber as in the previous examples, but a fiber bundle with a large number of side-emitting optical fibers 90. Each of the fibers 90 has a core 92 and a cladding 91 surrounding the core 92. The fibers 90 may be combined in a jacket 98. Just like an individual optical fiber, the fiber bundle may also be rigid or flexible.

More generally, the light guide 9 may also have a non-circular cross-section, also if provided in the form of an individual optical fiber as in the examples of FIG. 7. In the examples of FIG. 7, the cross section is non-circular because of the flattened cladding section or due to a polygonal or angular cross-sectional shape, as in the example shown on the right in FIG. 7. The example shown on the right in FIG. 8 also comprises a light guide 9 with a non-circular cross-sectional shape. In this case, the light guide 9 has a truncated parabolic or ellipsoidal cross-sectional profile. Here, the expression "truncated profile" means that the parabola or ellipse is cut off at a certain position in the manner of a paraboloid or ellipsoid reflector, so that a flattened cladding section 97 is resulting. In the case of such non-circular cross sections, the diameter is understood to mean the dimension of the largest transverse dimension.

The cross-sectional profile is in particular shaped such that the laterally emitted light is given a preferred direction or is partially or completely collimated in a direction perpendicular to the longitudinal extension of the light guide 9. In order to influence spatial light distribution in general, for example specifically collimation as in the present case, a reflective coating 99 may be applied on the cladding 91 of the light guide 9. Partial collimation is understood to mean that no bundle of parallel rays is produced, but the divergence of the exiting light is reduced.

According to one embodiment, collimation may be such that the light passes completely or substantially through the transparent pane 3 and is not or only to a lesser extent further transmitted by total internal reflection. In this way, directional illumination is achieved, emanating from the light guide.

As an alternative or in addition to a reflective coating 99, the profiled holder 17 may also have light directing properties. A simple possibility is to make the profiled holder 17 reflective or scattering or diffusely reflective on the inner surface thereof. This may also be implemented in sections thereof, in particular along strip-shaped sections extending along the longitudinal extension. Another way of directing light is achieved by an at least partial or section-wise transparency of the profiled holder 17 so that the light emitted by the light guide is passed through the profiled holder 17 for being emitted to the outside and/or for being injected into the transparent pane. An example of this is the embodiment according to FIG. 3.

Figure 9:
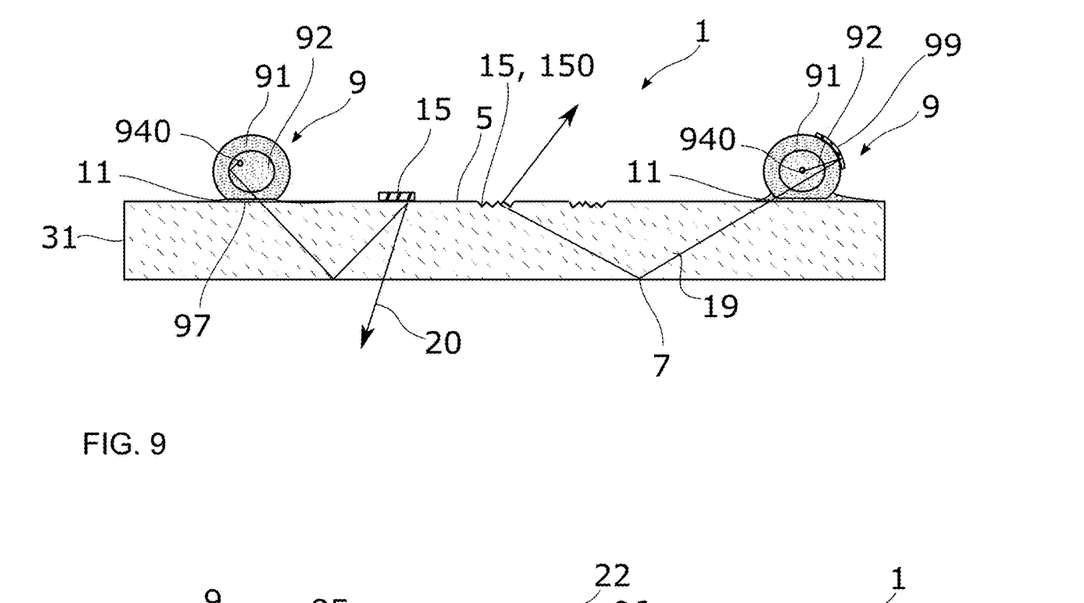
FIG. 9 shows examples in which the emission from the light guide exhibits a preferred direction obliquely to the transparent pane.

With the collimation, a particular preferred direction of light emission is achieved. It may also be advantageous for certain illumination purposes to achieve a preferred direction obliquely to the normal of the transparent pane. One technical effect thereof may in particular be to inject a higher proportion of the emitted light into the pane 3 in such a way that this light is guided within the pane by total internal reflection. According to one embodiment of the glazing 1, the light guide 9 is accordingly arranged or optically coupled to the transparent pane 3 in such a manner that the light emission has a preferred direction obliquely to the surface normal 50 of face 5. FIG. 9 shows examples of such arrangements. Both examples are variants to the embodiment of FIG. 7 on the left side. An individual light guide with a light scattering inner core 940 is provided, which has a flattened cladding section 97 bonded to the transparent pane 3 by a transparent adhesive 11. This coupling is advantageous, but not mandatory. Rather, any other coupling and/or fastening option described herein may be used as well.

In the case of the light guide 9 arranged on the left side of transparent pane 3 in FIG. 9, the preferred direction is achieved by an inner core 940 made of light diffusing glass and extending eccentrically within the core 92. The light ray 20 as indicated by way of example would be emitted towards the closest edge 31 in the case of a central arrangement of the inner core 940, while with the eccentric arrangement it experiences reflection at the interface to the cladding and thus is given a directional component towards the center of the transparent pane 3. In the example shown on the right, a reflective coating 99 is applied similarly to the example of FIG. 8, but here only on a portion of the cladding. The portion is tilted relative to the normal of face 5 and is therefore effective as a reflector which reflects the light incident on the coating obliquely to the transparent pane 3. This beam path is illustrated by way of exemplary light ray 19.

In the examples illustrated so far, the light output elements and the light deflecting element 14 were implemented as structures applied to the transparent pane 3. However, there are also other options for this purpose. Structures of this type may also be introduced into the material of the transparent pane or into the surface thereof. An example of this is also shown in FIG. 9. Some of the light output elements 15 are in the form of a surface relief 150 introduced into one of the faces of transparent pane 3, here. A simple form of a surface relief 150 is a roughened area. However, other structures such as prisms or lenses or facets may be introduced as well. Ablative or abrasive processes such as grinding or etching and also embossing may be used for the introducing process.

Figure 10:
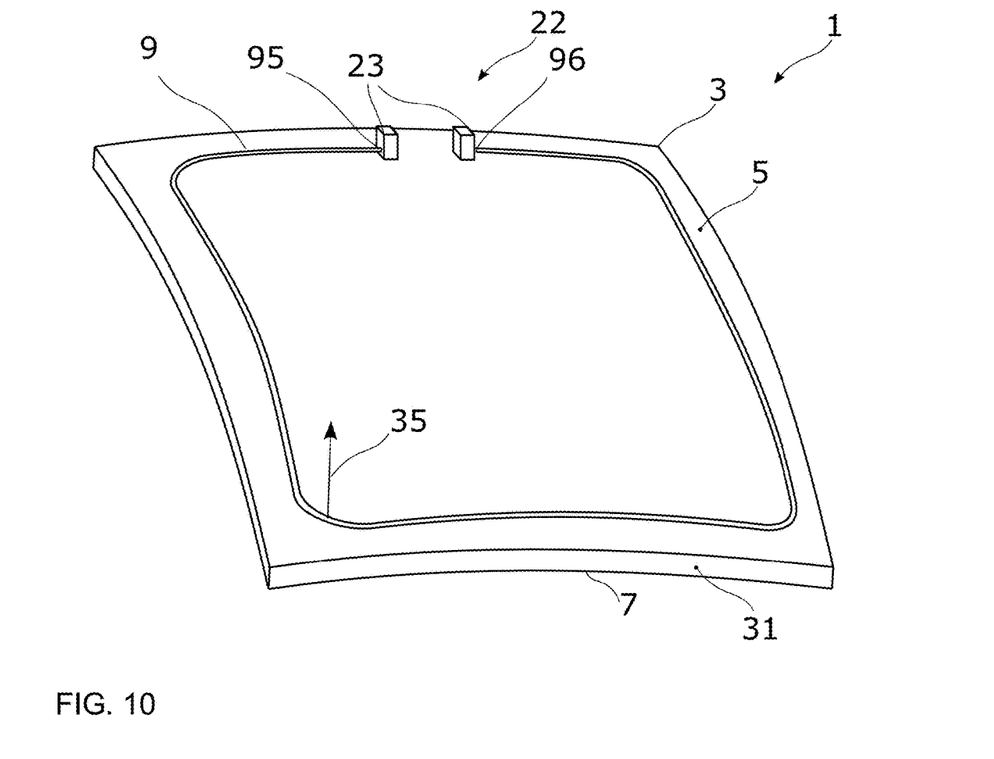
FIG. 10 shows glazing comprising a curved pane.

Most advantageously, the glazing 1 may also be easily implemented with a curved pane 3. According to a further embodiment of the invention it is therefore contemplated that the transparent pane 3 is bent in order to produce the glazing 1, and subsequently the light guide 9 is arranged on the face 5 so as to follow the curvature thereof. For this, FIG. 10 shows a glazing 1 comprising a transparent pane 3 with a curvature in two directions, i.e. a biaxial curvature. The light guide 9 is disposed and fixed on face 5 of the pane which has a convex curvature in this example, and follows the curvature of face 5. The curvature of pane 3 and the path of light guide 9 are preferably selected such that the radius of curvature of pane 3 along light guide 9 is at least 500 times greater than the radius of the light guide 9, or in the case of a light guide comprising a plurality of optical fibers 90 at least 500 times greater than the fiber radius. This makes it possible to fix a rigid light guide, such as an individual fiber with a light scattering inner core 940 on the curved face without further processing such as by hot forming. An adaptation to more strongly curved surfaces is of course also possible, for example by bending in a softened state.

Generally, the light guide 9 may also extend on the face 5 along a line that is curved at least in sections thereof. This means in particular a curve which is visible in a top view of the transparent pane, i.e. with the curvature vector of the line perpendicular to the face or having at least a component perpendicular to the face. A curvature vector 35 is indicated on the line along which the light guide 9 extends on the face 5, as an example for illustrating purposes. In the illustrated example, this line follows the outer contour of the pane 3 at a distance from the edge 31, and the corners of this contour are rounded. Such an arrangement creates a contour accentuation of the pane 3 when illuminated.

In the illustrated example, yet another embodiment is implemented. In this embodiment, the lighting device comprises two light sources, each one coupled to one of the end faces 95, 96. Again, semiconductor light emitters 23 are preferred here. The coupling to both ends of the light guide provides for higher light intensities and also for additional color shades of the emitted light in the case of light emitters of different color.

A glazing 1 according to the present disclosure allows to achieve typical luminance values from 300 cd/m$^2$ to 10000 cd/m$^2$, in particular from 500 to 2000 cd/m$^2$, when using light-emitting diodes. Depending on the coupling of the light guide 9 to the transparent pane 3 and arrangement on or at the pane, the geometry of the light guide 9, and the design or optical effect of, for example, the adhesive 11 and/or the profiled holder 17, and/or the reflective coating 99, and/or the groove 40, and/or the bracket 42, a luminous flux $I_{total}$ is injected into the pane. The fractions of this luminous flux or light directly emanating from the light guide 9 and transmitted across the pane, $I_{direct}$, and those further guided within the pane through total internal reflection, $I_{remote}$, can be set differently. With the paraboloid light guide as in the example of FIG. 8 it is possible to directly output all the light from the light guide 9 after it passed through the pane 3.

In the other extreme case, all the light can be injected into the pane. In this case, diffuse illumination can be achieved, or illumination determined solely by the arrangement of the output elements 15. The coupling is preferably made such that there is both a direct portion of the total luminous flux and a portion of the total luminous flux that is output in a distributed manner or remote of the light guide. According to one embodiment, it is contemplated that the light guide is coupled to the face 5 in such a way that the ratio between the luminous flux directly emanating from the light guide 9 and radiated by the glazing 1 without total internal reflection within the pane 3, $I_{direct}$, and the luminous flux emitted from the pane remote of the light guide 9 after total reflection, $I_{remote}$, is in a range from $I_{direct}/I_{remote}=0.01$ to $I_{direct}/I_{remote}=500$, preferably in the range from $I_{direct}/I_{remote}=0.1$ to $I_{direct}/I_{remote}=200$, most preferably in the range from 0.3 to 10, in particular from 1 to 15. This means that in the limit case, either the light emanating from the light guide is transmitted through the pane substantially directly, resulting in an essentially linear luminous line following the light guide's geometry, for example at $I_{direct}/I_{remote}=500$ and the remaining area of the pane is correspondingly less illuminated, or the light emitted by the light guide is essentially output through the surface of the pane, thus creating an impression of an essentially illuminated surface (with $I_{direct}/I_{remote}=0.01$).

According to a specific embodiment, the light is emitted mainly after total internal reflection. However, the light guide may still remain visible due to the direct light emission. In this case, the ratio of direct light to light emitted remotely after total internal reflection is in particular $I_{direct}/I_{remote}=0.1$ to $I_{direct}/I_{remote}=10$, preferably in the range from $I_{direct}/I_{remote}=0.25$ to $I_{direct}/I_{remote}=0.75$. According to a further, particularly preferred embodiment, the directly emitted light and light components emitted by the pane 3 close to the light guide are predominating. This creates a light source which is substantially still linear. Due to the fraction of light exiting at a distance from the light guide but still close thereto, a glare effect can be avoided or reduced. In particular, it may be suggested for this purpose that the intensity of the light exiting from the pane 3 at a distance from the light guide decays by a factor of $1/e(1/e=1/2.71828)$ within a distance A from the light guide. Accordingly, at a distance A perpendicular to the longitudinal extension of the light guide, the brightness of the light exiting there will be lower by a factor of $1/e$ than that of the light exiting directly next to the light guide but already after a reflection. This distance can be measured from the center of the light guide and is at most 50 times, preferably at most 20 times, most preferably not more than 10 times the diameter of the light guide. Besides the provision and density of light scattering elements, this distance may also be influenced by a tint of the pane 3, inter alia. Therefore, more generally, without being limited to the decay of light intensity as described above, a tinted pane 3 is provided according to one embodiment. In one embodiment, the tint may amount to at least 10%. This means that 10% of the light vertically passing through the pane 3 is absorbed due to the tint.

Even if the transparent pane is curved in the example shown in FIG. 10, the radius of curvature of the pane will be considerably larger than the radius of the light guide. The length on the face perpendicular to the longitudinal direction of the light guide 9 can therefore be assumed to be approximately straight. However, the face may also be shaped more strongly. The following figures show examples for this in cross-sectional views. Generally, without being limited to the illustrated examples, it is contemplated according to one embodiment of the invention that one of the faces 5, 7 has a groove or depression in which the light guide 9 is disposed. In the example shown in FIG. 11, the groove 40 has a triangular cross-sectional shape. Such a groove may be introduced into the transparent pane 3 as a facet cut, for example. As illustrated, the groove 40 is not so deep that the light guide 9 would be completely accommodated therein, so that it still protrudes from the groove 40, viewed from the nearest edge 31.

Figure 11:
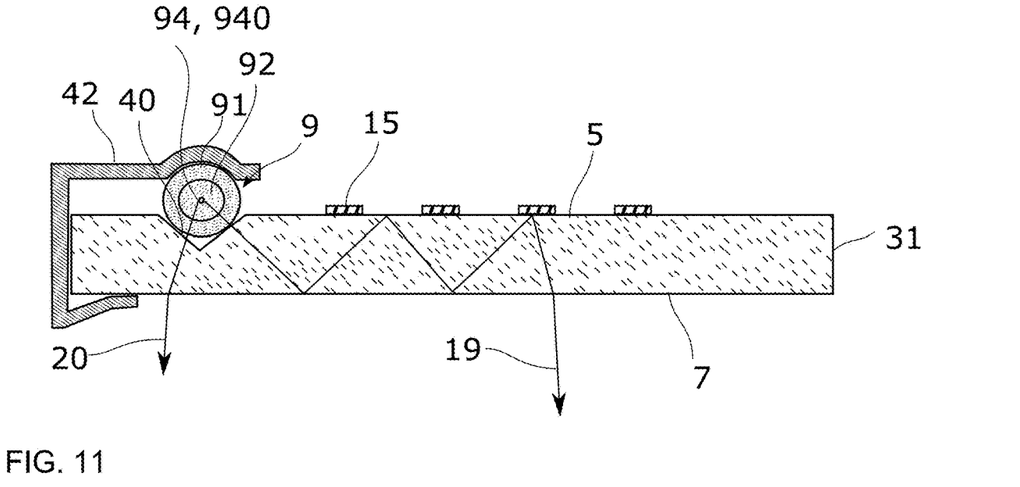
FIGS. 11 to 13 show embodiments with a groove in the face for accommodating the light guide.

In addition, this example shows a further possibility for fixing the light guide 9. In this example, the light guide is clamped onto the side face 5 by clips or brackets 42. It will be apparent to a person skilled in the art that this embodiment may be provided more generally and may also be employed as an alternative or additional fixation for other examples shown in the figures. The groove 40 is helpful for fixation, but not mandatory.

Figure 12:
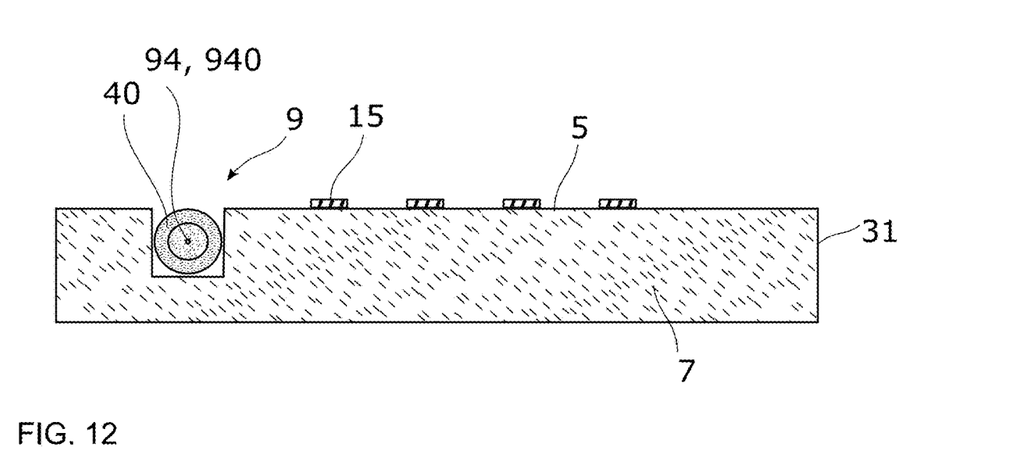

In the example of FIG. 12, the light guide 9 is now completely disposed in the groove 40 and no longer protrudes beyond it. The groove 40 has a rectangular cross-sectional shape her, by way of example. With such an arrangement, a high proportion of the light rays emanating from the light scattering element 94 with a directional component along the face 7 are captured and can be further guided within the pane 3 by total internal reflection.

Details on the fixation of the light guide 9 have been omitted in this illustration. For example, suitable clips or a transparent adhesive may again be used for fixation.

Figure 13:
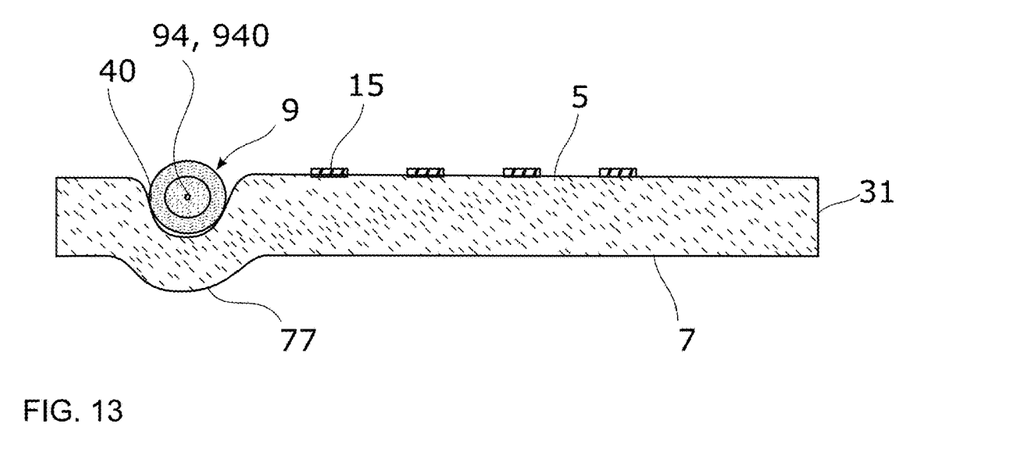

In the two examples of FIGS. 11 and 12, only one face was shaped so as to form a groove 40. Another option is to deform the entire pane 3 such that a groove 40 is formed for accommodating the light guide. Such an example is shown in FIG. 13. This example is generally based on a deformation and curvature of the pane 3 such that both faces have a curvature, such curvature defining the groove 40 on one of the faces 5, while the opposite face 7 has an area 77 of convex curvature opposite the groove 40.

In all of the exemplary embodiments in which fixation is achieved by other means than an adhesive, an adhesive or more generally an optical coupling medium such as a suitable resin may optionally be provided in order to improve optical coupling between the pane and the light guide. This optical coupling medium may in particular also provide a releasable coupling in order to allow for a replacement of the light guide or the pane. Such an optical coupling medium, preferably in the form of an adhesive or resin, may in particular be provided in the exemplary embodiments of FIGS. 5, 6, 7 (left side), 8 (left side), 11, 12, and 13 between the surface of the pane and the light guide. In order for an optical coupling medium to fulfill its purpose, it should have a higher refractive index than air, preferably a refractive index of at least 1.3. Without being limited to the specific exemplary embodiments, it is therefore contemplated according to one embodiment that a transparent optical coupling medium is provided between the light guide and the surface of the pane 3, which establishes a releasable connection between pane 3 and light guide 9.

| LIST OF REFERENCE NUMERALS | |
|---|---|
| 1 | Glazing |
| 3 | Pane |
| 5, 7 | Faces of 3 |
| 9 | Light guide |
| 11 | Transparent adhesive |
| 13 | Light blocking element |
| 14 | Light deflecting element |
| 15 | Light output element |
| 17 | Profiled holder |
| 18 | Latching element |
| 19, 20 | Light ray |
| 21 | Groove |
| 22 | Lighting device |
| 23 | Semiconductor light emitter |
| 25 | Passenger compartment |
| 26 | Headlining |
| 27 | Prism film |
| 28 | Light reflective or refractive surface |
| 31 | Edge |
| 33 | Light reflective coating on 31 |
| 35 | Curvature vector |
| 37 | Chamfer |
| 40 | Groove |
| 42 | Bracket |
| 50 | Surface normal of 5 |
| 77 | Area of 7 having convex curvature |
| 90 | Optical fiber |
| 91 | Cladding of 9 |
| 92 | Core of 9 |
| 93 | Longitudinal extension of light guide 9 |
| 94 | Light diffusing element |
| 95, 96 | End face of 9 |
| 97 | Flattened cladding section |
| 98 | Jacket for 90 |
| 99 | Reflective coating |
| 150 | Surface relief in the face |
| 940 | Inner core of light diffusing glass |
| 941 | Pore |
| 942 | Crystallite or particle |

What is claimed is:

1. A luminous glazing, comprising:
a pane transparent in a visible spectral range and having two opposite surfaces; and
an elongated light guide having a first end face, a second end face, and a longitudinal extension therebetween, the elongated light guide comprising a core surrounded by a cladding, the core having a higher refractive index than the cladding so that the core is capable of guiding light along the longitudinal extension,
the elongated light guide includes a scattering element so that light guided in the core is scattered out in distributed manner along the longitudinal extent in a light scattering area so that when light is injected into one of the first and second end faces the elongated light guide functions as a side-emitting light guide and forms a linear light source, and the elongated light guide extends along and is disposed on a surface of the two opposite surfaces such that the light scattering area is spaced apart from the surface and so that light guided in the core, scattered by the light scattering element, and laterally exiting from the elongated light guide enters the pane through the surface and can be transmitted through the pane to an opposite surface of the two opposite surfaces.

2. The glazing of claim 1, wherein the elongated light guide has a feature selected from a group consisting of: an inner core extending within the core along the longitudinal extension, a glass inner core extending within the core along the longitudinal extension, a plurality of the scattering element, a plurality of the scattering element that comprise pores, a plurality of the scattering element that comprise crystallites, a plurality of the scattering element that comprise particles, a plurality of the scattering element that comprise phase-separated zones, and combinations thereof.

3. The glazing of claim 1, further comprising a feature selected from a group consisting of: a transparent adhesive bonding the elongated light guide to the surface so that light emitted laterally from the elongated light guide is directed through the transparent adhesive to the surface, a transparent optical coupling medium provided between the elongated light guide and the surface of the pane, which establishes a releasable connection between pane the and the elongated light guide, the elongated light guide having a non-circular cross section, the elongated light guide having a polygonal cross section, the elongated light guide having a truncated ellipsoidal cross section, the elongated light guide having a truncated parabolic cross section, the elongated light guide having a flattened cladding section defining a contact surface of the elongated light guide on the surface of the pane, the elongated light guide having a diameter ranging from 200 μm to 3 mm, a ratio between a diameter of the elongated light guide and a thickness of the pane in a range from 0.01 to 5, a ratio between a diameter of the elongated light guide and a thickness of the pane in a range from 0.02 to 2.5, the pane having a thickness from 1 mm to 20 mm, the pane having a thickness from 2.5 mm to 8 mm, the light scattering area being a distance from the surface in a range from 100 micrometers to 3 millimeters, the cladding having a reflective coating that is configured to influence spatial light distribution, the elongated light guide extending on the surface along a line that is curved at least in sections thereof, the elongated light guide being coupled to the surface such that a ratio between luminous flux directly emanating from the elongated light guide and radiated by the glazing without total internal reflection within the pane and luminous flux emitted from the pane remote of the elongated light guide after total internal reflection is in a range from 0.01 to 500, the elongated light guide being coupled to the surface such that a ratio between luminous flux directly emanating from the elongated light guide and radiated by the glazing without total internal reflection within the pane and luminous flux emitted from the pane remote of the elongated light guide after total internal reflection is in a range from 0.3 to 10, an intensity of the light exiting from the pane at a distance from the elongated light guide that decays by a factor of 1/e within a distance of at most 50 times the diameter of the elongated light guide, and combinations thereof.

4. The glazing of claim 1, wherein the elongated light guide is optically coupled to the surface such that a part of the light emitted laterally from the elongated light guide enters the pane and is guided in the pane through total internal reflection.

5. The glazing of claim 1, wherein the pane has light output elements that either cause light guided in the pane by total internal reflection to exit from the pane or are excited by the elongated light guided in the pane to emit light by fluorescence or phosphorescence.

6. The glazing of claim 1, further comprising a semiconductor light emitter coupled to the elongated light guide.

7. The glazing of claim 1, wherein the pane has a curvature and the elongated light guide is disposed thereon so as to follow the curvature.

8. The glazing of claim 7, wherein the curvature of the pane has a first radius and the elongated light guide has a second radius, wherein the first radius is at least 500 times larger than the second radius.

9. The glazing of claim 1, wherein the elongated light guide is arranged on the surface at a distance from an edge of the pane.

10. The glazing of claim 1, wherein the elongated light guide is a single optical fiber or a fiber bundle comprising a plurality of side-emitting optical fibers.

11. The glazing of claim 1, further comprising a light blocking element arranged on the opposite surface, the light blocking element partially blocking light transmitted from the elongated light guide through the pane from exiting through the opposite surface.

12. The glazing of claim 11, wherein the light blocking element is a light deflecting element that redirects incident light back into the pane.

13. The glazing of claim 1, wherein the elongated light guide is arranged in such a way or optically coupled to the pane in such a way that emitted light has a direction obliquely relative to a normal of the surface.

14. The glazing of claim 1, further comprising a profiled holder connected to the pane, the profiled holder holding the elongated light guide in contact to or at a distance from the surface.

15. The glazing of claim 1, wherein the pane has an edge that is light-reflective so that light guided within the pane through total internal reflection and incident on the edge is reflected back into the pane.

16. The glazing of claim 1, wherein one of the two opposite surfaces has a groove in which the elongated light guide is disposed.

17. The glazing of claim 1, wherein the pane is sized and configured to a use selected from a group consisting of an external glazing, a vehicle glazing, a roof glazing of a vehicle, and a building glazing.

18. A method for producing a luminous glazing, comprising:

providing a pane that is transparent in the visible spectral range and has two opposite faces;

providing an elongated light guide that is capable of guiding light along a longitudinal extension of the elongated light guide, the elongated light guide including a light scattering element that causes light guided in the core to be scattered out in a distributed manner along the longitudinal extension in a light scattering area so that when light is injected into end faces of the elongated light guide acts as a side-emitting light guide and forms a linear light source; and fixing the elongated light guide on one surface of the pane such that the elongated light guide extends along the two opposite faces and the light scattering area is spaced apart from the surface so that light guided in the elongated light guide, scattered by the light scattering element, and laterally exiting from the elongated light guide enters the pane through the surface and is transmitted through the pane to an opposite surface.

19. The method of claim 18, further comprising bonding the elongated light guide to the pane using a transparent adhesive or introducing the elongated light guide into a groove of a profiled holder.

20. The method of claim 18, further comprising bending the pane to a curvature and disposing the elongated light guide on the surface following the curvature.

* * * * *